Nov. 7, 1939.  S. A. SNELL  2,178,707
VELOCIPEDE STRUCTURE
Original Filed April 5, 1937

INVENTOR
SAMUEL A. SNELL
BY
ATTORNEYS

Patented Nov. 7, 1939

2,178,707

UNITED STATES PATENT OFFICE 2,178,707

VELOCIPEDE STRUCTURE

Samuel A. Snell, Toledo, Ohio, assignor to The American-National Company, Toledo, Ohio, a corporation of Ohio Original application April 5, 1937, Serial No. 135,156. Divided and this application September 20, 1937, Serial No. 164,806

8 Claims. (Cl. 280—291)

This invention relates generally to juvenile vehicles such as velocipedes and constitutes a division of my application filed April 5, 1937, bearing Serial No. 135,156.

One of the essential objects of the invention is to provide a velocipede with a flexible backbone and a flexible seat support which will effectively cushion the rider from road shocks and jars and will materially improve the riding qualities of the vehicle.

Another object is to provide a sturdy velocipede that is simple in construction and that can be manufactured at a comparatively low cost.

Figure 1:
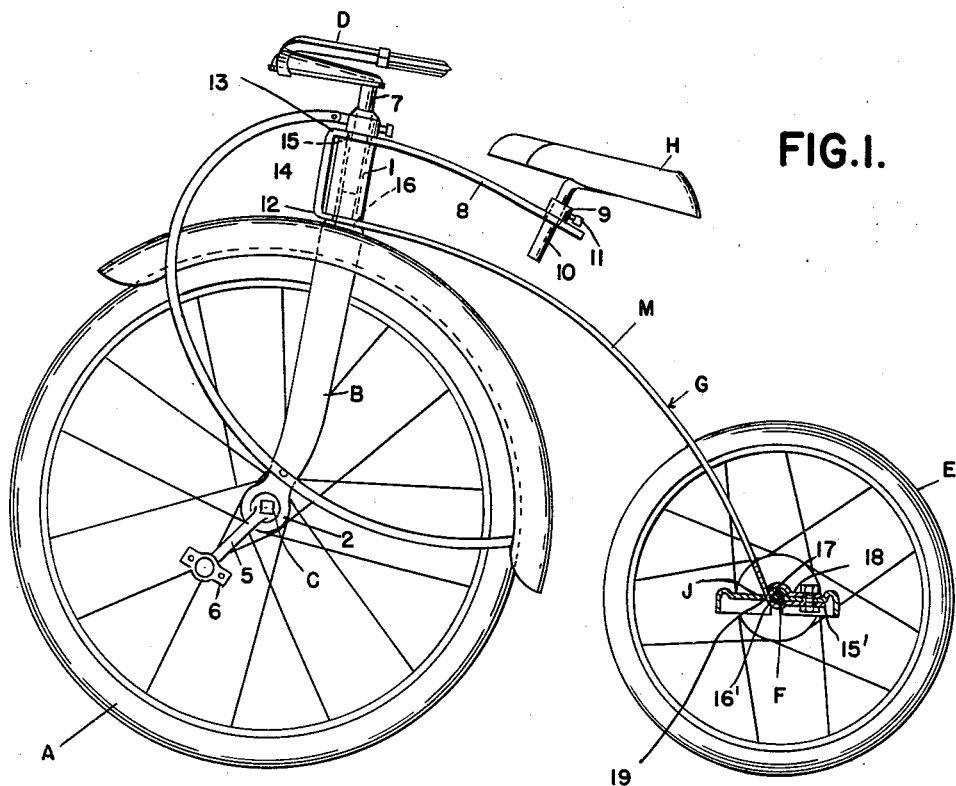
Figure 2:
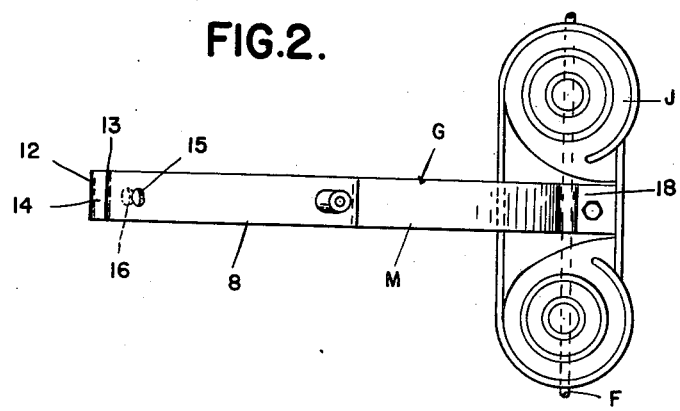

Other objects, advantages and novel details of construction of this invention will be made more apparent as this description proceeds, especially when considered in connection with the accompanying drawing, wherein:

Figure 1 is a side elevation of a velocipede embodying my invention, with parts broken away and in section; and Figure 2 is a top plan view of the backbone and rear platform illustrated in Figure 1.

Referring now to the drawing, A is the front wheel, B is a fork straddling said wheel and having an upstanding shank 1, C is an axle for the front wheel journaled in the furcations 2 of said fork and provided at opposite ends thereof with suitable propelling cranks 5 and pedals 6, and D is the handle bar having a depending shaft 7 rigid with the shank 1. E are the rear wheels, F is an axle for said rear wheels, G is a backbone extending between the fork B and axle F and having a return-bent portion 8 forming a support for a seat H, and J is a platform on the axle and connected to said backbone.

9 is a tubular bushing anchored in the return-bent portion 8 near its rear end and receiving the supporting post 10 for the seat H. 11 is a set screw at one side of the bushing for holding the post 10 in adjusted position.

In the present instance the backbone G and seat support 8 are formed from a single strip M of spring steel and therefore are flexible to afford the desirable riding qualities mentioned. Preferably, the strip M has substantially right angle bends at 12 and 13, and the intermediate portion 14 between said bends is straight and substantially parallel to the shank 1. Just in rear of these bends 12 and 13 the strip M is apertured as at 15 and 16 to receive the shank 1 of the fork.

The backbone G curves downwardly and rearwardly from the upright intermediate portion 14 to the rear axle F and terminates below the platform J in a relatively short, substantially straight, horizontal portion 15. At the juncture of the curved backbone G and horizontal portion 15' is an upwardly opening, substantially U-shaped portion 16' that receives and forms a support for the rear axle F. The platform J is arched as at 17 to receive the rear axle and is held thereon by a clip or washer 18 that is bolted to the horizontal end portion 15 of the backbone. By referring to Figure 1, it will be noted that the backbone G extends through an opening 19 in the platform J so that the latter is clamped rigidly between the horizontal portion 15 of the backbone and the clip 18.

Thus, from the foregoing it will be apparent that my construction effectively prevents jarring and eliminates the possibility of injury to the spinal column and the nervous system of the rider. Instead it gives an elastic, rhythmic action which is both enjoyable and health building. As a precautionary feature, the return-bent portion 8 is of such flexibility and is spaced close enough to the backbone G to permit the seat post 10, when subjected to abnormal loads or strains, to engage and be cushioned by the flexible backbone G. Thus, the return-bent portion 8 and backbone G respectively constitute primary and secondary cushioning means for the rider.

What I claim as my invention is:

1. In a velocipede, an axle, a backbone having a substantially horizontal portion beneath the axle, a clip above the axle, a platform on the axle between the clip and the horizontal portion of the backbone, and a connection between the clip and horizontal portion of the backbone holding the platform on the axle.

2. In a velocipede, a substantially horizontal platform, an axle on the underside of said platform, a backbone having an upright part extending through the platform and having a substantially horizontal part extending rearwardly beneath the axle in substantially parallel relation to the platform, and a connection between the platform and the rearwardly extending horizontal part of the backbone causing the axle to be clamped therebetween.

3. In a velocipede, a backbone having a substantially L-shaped portion, an axle on the base of said L at the juncture of the base and upright part of the L, a platform sleeved on the upright part of the L above the axle and disposed substantially parallel to the base of the L, and means securing the platform to the base of the L whereby the axle will be held between the base of the L and said platform.

4. In a velocipede, a backbone having a substantially L-shaped portion, an axle on the base of said L at the juncture of the base and upright part of the L, and means holding the axle in said position including a platform mounted on the base of said L-shaped portion.

5. In a velocipede, an axle, a substantially horizontal platform on said axle, a backbone having an upright part extending bodily through said platform in advance of said axle and provided below the axle and platform with a substantially horizontal part, said horizontal part being provided in rear of said axle with a seat for said platform, the horizontal part of said backbone adjacent said upright part forming a seat for the axle, and a connection between said platform and first mentioned seat maintaining said axle on the second mentioned seat.

6. In a velocipede, an axle, a substantially horizontal platform on said axle, a backbone having an upright part extending through the platform and provided beneath the latter with a substantially horizontal part forming a seat for the axle, and a connection between the platform and horizontal part of the backbone maintaining the axle on said seat.

7. In a velocipede, an axle, a substantially horizontal platform on said axle, a backbone having an upright part extending bodily through the platform at one side of the axle and having a substantially horizontal part beneath and forming a seat for the platform, opposed portions of said platform and backbone embracing and forming a bearing for said axle, and a connection between said platform and the horizontal part of said backbone causing the axle to be held in said bearing.

8. In a velocipede, a backbone having a substantially L-shaped portion, an axle on the base of the L at the juncture of the base and upright part of the L, a platform on the base of the L, and means maintaining both the axle and platform on the base of the L-shaped part of said backbone.

SAMUEL A. SNELL.